(12) United States Patent
Azuma et al.

(10) Patent No.: US 7,932,957 B2
(45) Date of Patent: Apr. 26, 2011

(54) RECEIVER APPARATUS AND RECEIVER SYSTEM

(75) Inventors: Hitoshi Azuma, Tenri (JP); Tsutomu Jitsuhara, Higashiosaka (JP); Miyoshi Yamauchi, Osaka (JP); Toyomi Yonemaru, Nabari (JP); Hitoshi Ogino, Toyonaka (JP); Akio Ito, Sakai (JP); Junichi Somei, Nara (JP); Akira Tokuda, Osaka (JP); Youichi Yuuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1262 days.

(21) Appl. No.: 11/518,222

(22) Filed: Sep. 11, 2006

(65) Prior Publication Data
US 2007/0058093 A1 Mar. 15, 2007

(30) Foreign Application Priority Data
Sep. 9, 2005 (JP) ................................. 2005-261624

(51) Int. Cl.
*H04N 5/44* (2011.01)
*H04N 4/445* (2006.01)
*H04N 5/50* (2006.01)
*H04N 5/62* (2006.01)
*H03J 3/00* (2006.01)
*H04B 1/10* (2006.01)

(52) U.S. Cl. ........ 348/725; 348/737; 348/726; 348/731; 334/85; 455/301; 455/310

(58) Field of Classification Search .................... 348/87, 348/725, 726, 731, 737; 334/85; 455/300, 455/301, 310, 317
See application file for complete search history.

(56) References Cited

U.S. PATENT DOCUMENTS

| | | | | |
|---|---|---|---|---|
| 5,369,552 A | * | 11/1994 | Barnes et al. ................. | 361/816 |
| 5,710,999 A | * | 1/1998 | Iwase et al. .................... | 455/349 |
| 5,718,605 A | | 2/1998 | Morikawa et al. | |
| 5,737,035 A | * | 4/1998 | Rotzoll ......................... | 348/725 |
| 5,955,988 A | | 9/1999 | Blonstein et al. | |
| 5,974,095 A | | 10/1999 | Kitaura et al. | |
| 6,040,851 A | * | 3/2000 | Cheng et al. .................. | 725/132 |
| 6,131,023 A | * | 10/2000 | Matsuura ...................... | 455/301 |
| 6,147,713 A | | 11/2000 | Robbins et al. | |

(Continued)

FOREIGN PATENT DOCUMENTS

CN 2520615 Y 11/2002

(Continued)

OTHER PUBLICATIONS

U.S. Office Action mailed May 26, 2010 in U.S. Appl. No. 11/505,994.

(Continued)

*Primary Examiner* — Brian Yenke
(74) *Attorney, Agent, or Firm* — Nixon & Vanderhye P.C.

(57) ABSTRACT

A receiver apparatus 3 has a digital circuit portion 13 that converts a compressed digital signal outputted from a digital demodulating portion 12 into digital video and audio signals and a video/audio output circuit 14 that converts the digital video and audio signals outputted from the digital circuit portion 13 into analog video and audio signals. With this configuration, a video/audio processing IC for digital signal processing no longer needs to be mounted on the circuit board of a video display apparatus 4, and thus a receiver system can be realized with a video display apparatus having a simple configuration.

16 Claims, 4 Drawing Sheets

U.S. PATENT DOCUMENTS

| | | | |
|---|---|---|---|
| 6,160,571 A * | 12/2000 | Wang | 725/127 |
| 6,177,964 B1 | 1/2001 | Birleson et al. | |
| 6,400,419 B1 | 6/2002 | Yamamoto | |
| 6,401,510 B1 | 12/2002 | Moon | |
| 6,678,011 B2 | 1/2004 | Yanagi et al. | |
| 6,937,482 B2 | 8/2005 | Kooker et al. | |
| 7,030,939 B2 * | 4/2006 | Yamamoto | 348/731 |
| 7,030,940 B2 | 4/2006 | Sasaki | |
| 7,039,941 B1 | 5/2006 | Caporizzo et al. | |
| 7,042,529 B2 * | 5/2006 | Wakamori et al. | 348/836 |
| 7,164,449 B1 | 1/2007 | White et al. | |
| 7,199,844 B2 | 4/2007 | Utsunomiya et al. | |
| 7,224,953 B2 * | 5/2007 | Hosoi | 455/301 |
| 7,268,836 B2 * | 9/2007 | Yamamoto | 348/731 |
| 7,289,167 B2 * | 10/2007 | Yamamoto | 348/731 |
| 7,408,495 B2 * | 8/2008 | Stein et al. | 341/155 |
| 7,480,495 B2 | 1/2009 | Matsushima et al. | |
| 7,502,590 B2 | 3/2009 | Suzu | |
| 7,692,726 B1 | 4/2010 | Greenberg | |
| 2002/0085126 A1 | 7/2002 | Matsumoto et al. | |
| 2003/0132455 A1 | 7/2003 | Utsunomiya et al. | |
| 2005/0009481 A1 | 1/2005 | Bushner | |
| 2006/0026661 A1 | 2/2006 | McMullin et al. | |
| 2006/0050186 A1 | 3/2006 | Hosoi | |
| 2007/0046831 A1 | 3/2007 | Jitsuhara et al. | |
| 2007/0058093 A1 | 3/2007 | Azuma et al. | |
| 2007/0103597 A1 | 5/2007 | Shintani | |
| 2007/0216806 A1 | 9/2007 | Maehara | |
| 2007/0216814 A1 | 9/2007 | Azuma | |
| 2007/0222897 A1 | 9/2007 | Jitsuhara | |
| 2007/0229716 A1 | 10/2007 | Utsunomiya et al. | |

FOREIGN PATENT DOCUMENTS

| | | |
|---|---|---|
| CN | 2622944 Y | 6/2004 |
| CN | 2658940 Y | 11/2004 |
| CN | 2694675 Y | 4/2005 |
| CN | 1683857 A | 10/2005 |
| JP | 54 011008 | 1/1979 |
| JP | 61-200781 A | 9/1986 |
| JP | 7-327176 A | 12/1995 |
| JP | 11-289272 A | 10/1999 |
| JP | 2000-068673 | 3/2000 |
| JP | 2001-320744 A | 11/2001 |
| JP | 2002-152063 | 5/2002 |
| JP | 2003-61009 A | 2/2003 |
| JP | 2003-189203 A | 7/2003 |
| JP | 3097065 U | 7/2003 |
| JP | 2005-039468 A | 2/2005 |
| JP | 3113691 U | 8/2005 |
| KR | 1993-0014560 A | 7/1993 |
| KR | 1997-0019629 A | 4/1997 |
| KR | 2003-0088188 A | 11/2003 |
| KR | 10-0480687 B1 | 6/2005 |
| WO | 02-071747 A1 | 9/2002 |

OTHER PUBLICATIONS

Partial English translation of the Japanese Notification of Grounds for Rejection mailed Jun. 10, 2008 in the Japanese application.
English translation of the Chinese Office Action mailed Mar. 13, 2009 in corresponding Chinese application 2006101669865.
U.S. Appl. No. 11/634,197, filed Dec. 6, 2006, entitled "Receiver Apparatus and Receiver System".
U.S. Appl. No. 11/606,959, filed Dec. 1, 2006, entitled "Receiver Apparatus and Receiver System".
U.S. Office Action mailed Aug. 18, 2010 in co-pending U.S. Appl. No. 11/593,508.
Partial English translation of the Japanese Notification of Grounds for Rejection mailed Jun. 10, 2008 in the Japanese application of co-pending U.S. Appl. No. 11/634,197.
Partial English translation of the Japanese Notification of Grounds for Rejection mailed Jun. 10, 2008 in the Japanese application of co-pending U.S. Appl. No. 11/606,959.
Office Action mailed Nov. 23, 2010 in related U.S. Appl. No. 11/634,197 (10 pages).
U.S. Appl. No. 11/607,011, filed Dec. 1, 2006, entitled "Receiver Apparatus and Receiver System".
Office Action mailed Sep. 29, 2010 in related U.S. Appl. No. 11/606,959, (14 pages).
Office Action mailed Dec. 28, 2010 in related U.S. Appl. No. 11/607,011 (13 pages).

* cited by examiner

<WHEN FITTED IN UPRIGHT POSITION>

FIG.3B

<WHEN FITTED IN FLAT POSITION>

FIG.4    PRIOR ART

RECEIVER APPARATUS AND RECEIVER SYSTEM

This nonprovisional application claims priority under 35 U.S.C. §119(a) on Patent Application No. 2005-261624 filed in Japan on Sep. 9, 2005, the entire contents of which are hereby incorporated by reference.

BACKGROUND OF THE INVENTION

1. Field of the Invention

One or more aspects of the present invention relates to a receiver apparatus and a receiver system for receiving a radio-frequency signal such as a digital television signal.

2. Description of Related Art

Figure 4:
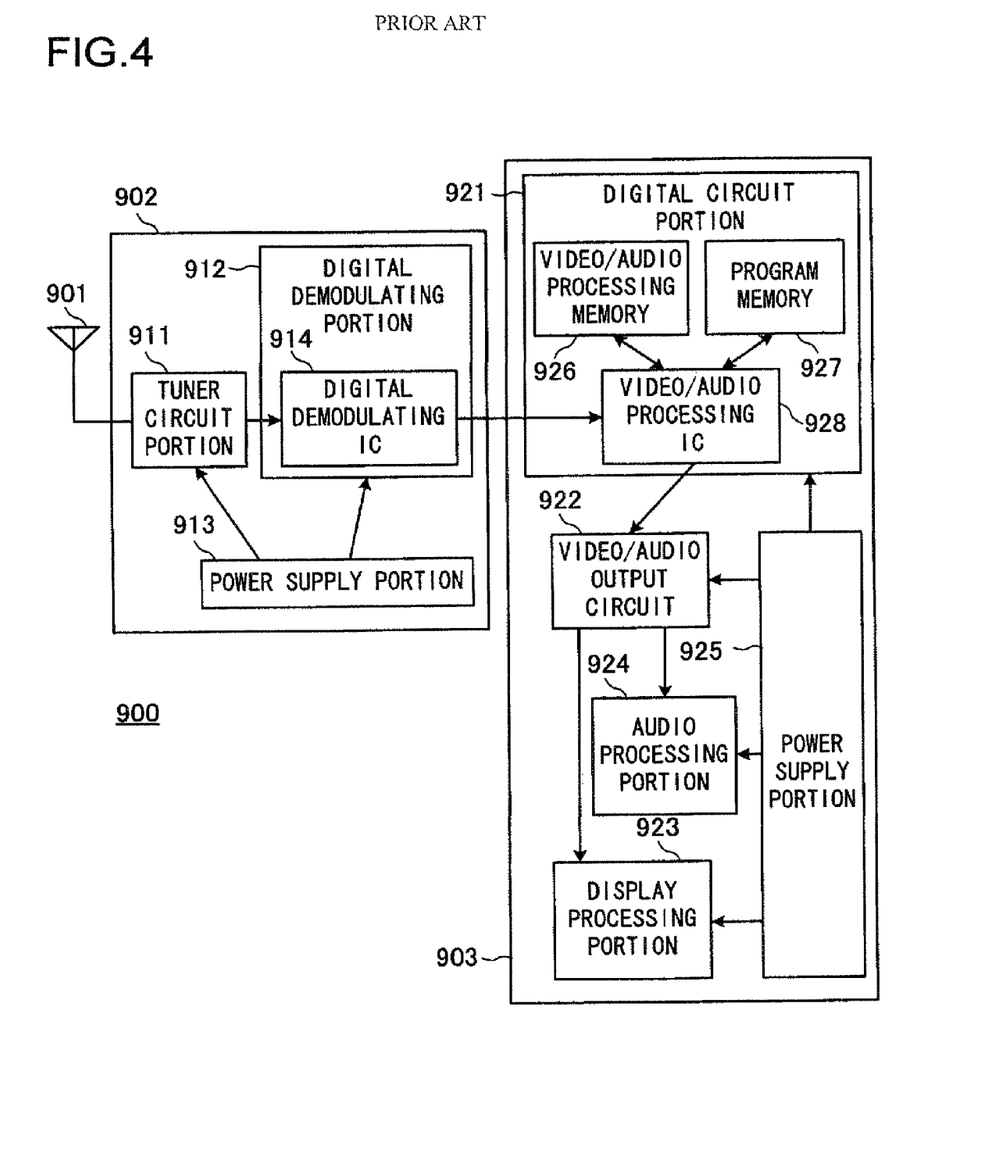
FIG. 4 is a block diagram showing an outline of the configuration of a conventional receiver system.

FIG. 4 is a block diagram showing an outline of the configuration of a conventional receiver system. The receiver system 900 shown in FIG. 4 is composed of: an antenna 901 for receiving a radio-frequency signal; a receiver apparatus 902 for performing predetermined processing on the signal received by the antenna 901 to acquire a desired signal; and a video display apparatus 903 for performing predetermined processing on the signal acquired by the receiver apparatus 902 to extract video and audio signals.

The receiver apparatus 902 is provided with: a tuner circuit portion 911 that converts the radio-frequency signal received by the antenna 901 into an intermediate-frequency signal; a digital demodulating portion 912 that converts the intermediate-frequency signal outputted from the tuner circuit portion 911 into a compressed digital signal; and a power supply portion 913 that feeds the tuner circuit portion 911 and the digital demodulating portion 912 with electric power from which they operate. The digital demodulating portion 912 is provided with a digital demodulating IC 914, which is a processing IC for converting the intermediate-frequency signal into a digital signal.

The video display apparatus 903 is provided with: a digital circuit portion 921 that converts the compressed digital signal fed from the receiver apparatus 902 into digital video and audio signals; a video/audio output circuit 922 that converts the digital video and audio signals outputted from the digital circuit portion 921 into analog video and audio signals; a display processing portion 923 that performs processing for displaying video based on the analog video signal outputted from the video/audio output circuit 922; an audio processing portion 924 that performs processing for outputting audio based on the analog audio signal outputted from the video/audio output circuit 922; and a power supply portion 925 that feeds the digital circuit portion 921, the video/audio output circuit 922, the display processing portion 923, and the audio processing portion 924 with electric power from which they operate. The digital circuit portion 921 is provided with: a video/audio processing IC 928 for extracting video and audio signals from the compressed digital signal; a video/audio processing memory 926 for temporarily storing data being processed during video/audio processing; and a program memory 927 for storing control codes for controlling the receiver apparatus.

In this conventional receiver system 900 configured as described above, the receiver apparatus 902 is electromagnetically shielded by being covered with a shield. On the other hand, the video display apparatus 903 has many functional blocks mounted on the circuit board thereof, namely the video/audio processing IC 928, the video/audio processing memory 926, the program memory 927, the video/audio output circuit 922, the display processing portion 923, and the audio processing portion 924. This requires an accordingly large number of components and conductors to be mounted and laid on the circuit board of the video display apparatus 903, which thus necessitates the use of a multiple-layer circuit board.

Moreover, the above-mentioned functional blocks mounted on the circuit board of the video display apparatus 903, namely the video/audio processing IC 928, the video/audio processing memory 926, the program memory 927, the video/audio output circuit 922, the display processing portion 923, and the audio processing portion 924, generate unnecessary electromagnetic emission and noise, against which measures need to be taken on the video display apparatus 903 as by providing it with an additional shield.

Furthermore, the above-mentioned functional blocks mounted on the circuit board of the video display apparatus 903, namely the video/audio processing IC 928, the video/audio processing memory 926, the program memory 927, the video/audio output circuit 922, the display processing portion 923, and the audio processing portion 924, also generate heat, against which measures need to be taken as by increasing the area of the circuit board or providing it with an additional heat-dissipating plate.

SUMMARY OF THE INVENTION

In view of the conventionally encountered inconveniences mentioned above, it is an object of the present invention to provide a receiver system provided with a video display apparatus having a simple configuration.

To achieve the above object, according to one or more aspects of the present invention, a receiver apparatus is provided with: a tuner circuit portion that converts a radio-frequency signal received by an antenna into an intermediate-frequency signal; a digital demodulating portion that converts the intermediate-frequency signal outputted from the tuner circuit portion into a compressed digital signal; a digital circuit portion that converts the compressed digital signal outputted from the digital demodulating portion into digital video and audio signals; and a video/audio output circuit that converts the digital video and audio signals outputted from the digital circuit portion into analog video and audio signals. Here, the receiver apparatus is covered with a chassis over all the faces of the receiver apparatus facing outside it.

With the configuration according to the aspects of the present invention, a digital circuit portion and a video/audio output circuit, which are conventionally incorporated in a video display apparatus, are mounted on the circuit board of a receiver apparatus. This makes it possible to realize the video display apparatus with a single-layer circuit board instead of a multiple-layer circuit board. Moreover, by performing the soldering of the jumper wires, the soldering of the connector pins, and the soldering between the chassis and the ground patterns on the same face, it is possible to reduce the number of manufacturing steps. Furthermore, it is possible to change the configuration of the video display apparatus with almost no change in the receiver apparatus.

DETAILED DESCRIPTION OF PREFERRED EMBODIMENTS

Figure 1:
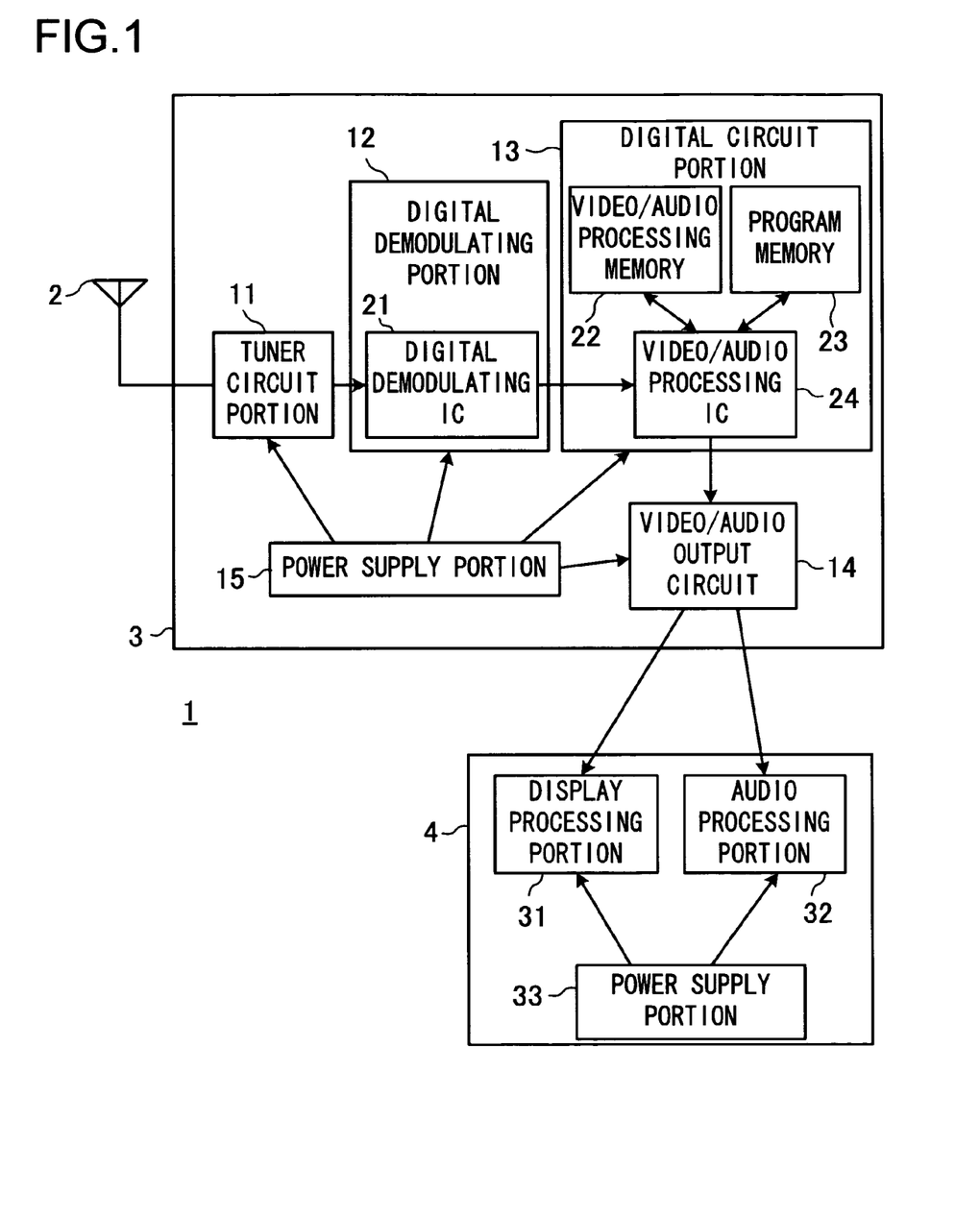
FIG. 1 is a block diagram showing an outline of the configuration of a receiver system according to an embodiment of the present invention.

Hereinafter, the configuration of a receiver system according to one or more aspects of the present invention will be described with reference to the accompanying drawings. FIG. 1 is a block diagram showing an outline of the configuration of a receiver system according to an embodiment of the present invention.

The receiver system 1 shown in FIG. 1 includes: an antenna 2 for receiving a radio-frequency signal; a receiver apparatus 3 for performing predetermined processing on the signal received by the antenna 2 to acquire video and audio signals; and a video display apparatus 4 for displaying video based on the video signal fed from the receiver apparatus 3 and/or outputs audio based on the audio signal fed from the receiver apparatus 3. The antenna 2 is connected via a coaxial cable to a tuner input terminal of the receiver apparatus 3, and an interface terminal of the receiver apparatus 3 is connected to the video display apparatus 4.

The receiver apparatus 3 includes: a tuner circuit portion 11 that converts the radio-frequency signal received by the antenna 2 into an intermediate-frequency signal (hereinafter referred to as the "IF signal"); a digital demodulating portion 12 that converts the IF signal outputted from the tuner circuit portion 11 into a compressed digital signal; a digital circuit portion 13 that converts the compressed digital signal outputted from the digital demodulating portion 12 into digital video and audio signals; a video/audio output circuit 14 that converts the digital video and audio signals outputted from the digital circuit portion 13 into analog video and audio signals; and a power supply portion 15 that feeds the tuner circuit portion 11, the digital demodulating portion 12, the digital circuit portion 13, and the video/audio output circuit 14 with electric power from which they operate.

The digital demodulating portion 12 includes a digital demodulating IC 21, which is a processing IC for converting the IF signal into a digital signal. The digital circuit portion 13 includes: a video/audio processing IC 24 for extracting video and audio signals from the compressed digital signal; a video/audio processing memory 22 for storing the compressed digital video and audio signals and decoded digital video and audio signals; and a program memory 23 for storing control codes for controlling the receiver apparatus. A serial control signal for controlling the tuner circuit portion 11 and the digital demodulating IC 21 is fed to the video/audio processing IC 24.

The video display apparatus 4 includes: a display processing portion 31 that performs processing for displaying video based on the analog video signal fed from the receiver apparatus 3; an audio processing portion 32 that performs processing for outputting audio based on the analog audio signal fed from the receiver apparatus 3; and a power supply portion 33 that feeds the display processing portion 31 and the audio processing portion 32 with electric power from which they operate.

Figure 2A:
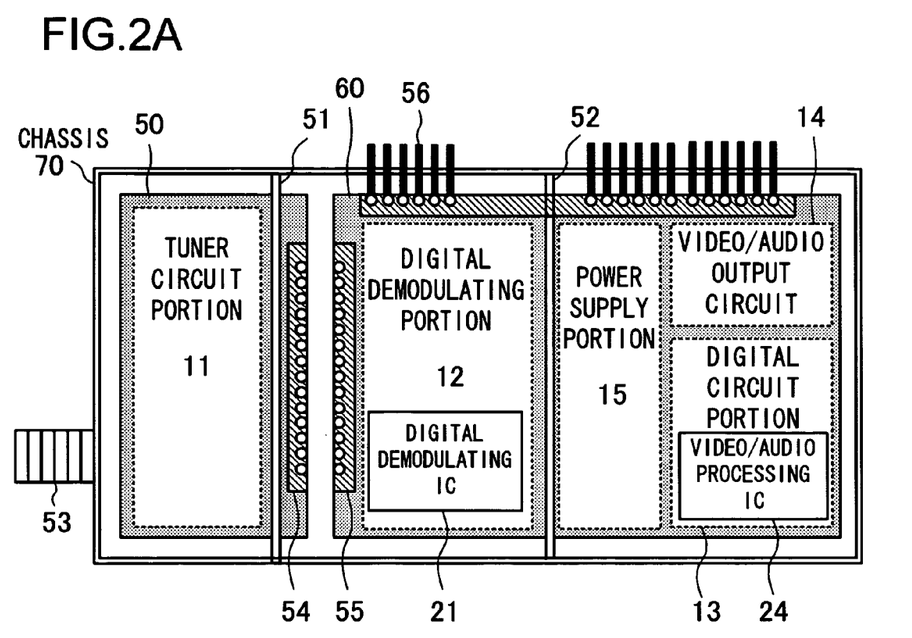
FIGS. 2A and 2B are diagrams schematically showing how functional blocks are mounted on the receiver apparatus 3 shown in FIG. 1.
Figure 2B:
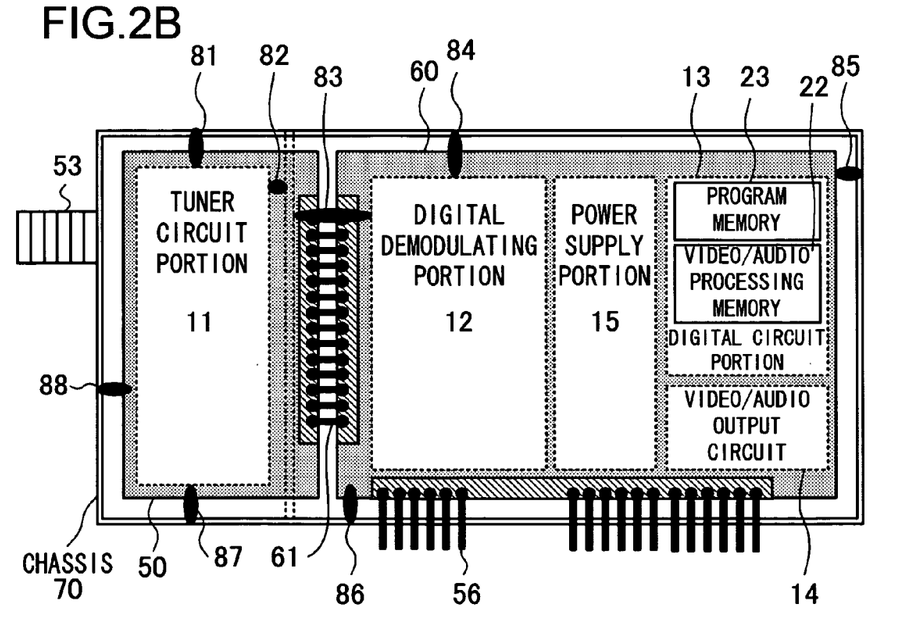

FIGS. 2A and 2B are diagrams schematically showing how functional blocks are mounted on the receiver apparatus 3 shown in FIG. 1, with FIG. 2A showing the receiver apparatus 3 as seen from one face (top face) thereof and FIG. 2B showing the receiver apparatus 3 as seen from the other face (bottom face) thereof.

As shown in FIG. 2A, the receiver apparatus 3 is composed of two circuit boards, namely a first circuit board 50 and a second circuit board 60. Between these circuit boards, a first shield plate 51 is inserted to electromagnetically shield them from each other.

Mounted on the first circuit board 50 is the tuner circuit portion 11. The first circuit board 50 is fitted on a chassis 70, and the analog ground pattern of the tuner circuit portion 11 is electrically connected to the chassis 70. The first circuit board 50 is provided with a tuner input terminal 53, via which the radio-frequency signal received by the antenna 2 is fed to the tuner circuit portion 11. The chassis 70 has lids fitted thereto, one on the top face and another on the bottom face thereof, and thereby the first and second circuit boards 50 and 60 are each covered with a shield.

The first circuit board 50 is also provided with a first connector 54 along the edge thereof opposite to the edge at which the tuner input terminal 53 is provided. The second circuit board 60 is provided with a second connector 55 along the edge thereof facing the first circuit board 50. The first and second connectors 54 and 55 are electrically connected together with jumper wires 61. These jumper wires 61 may all be connected only on one face (bottom face) of each circuit board.

Mounted on the second circuit board 60 are the digital demodulating portion 12, the digital circuit portion 13, the video/audio output circuit 14, and the power supply portion 15. As described above, the second circuit board 60 is electromagnetically shielded with the first shield plate 51 provided between it and the first circuit board 50.

The second circuit board 60 is provided with a third connector 56 along one edge thereof. The third connector 56 includes, in addition to the input/output terminals of the tuner circuit portion 11, the input/output terminals related to the functional blocks mounted on the second circuit board 60, namely the digital demodulating portion 12, the digital circuit portion 13, the video/audio output circuit 14, and the power supply portion 15. Within the third connector 56, near the first circuit board 50 is arranged the IF output terminal of the tuner circuit portion 11. Via this IF output terminal, the IF signal is outputted. Within the third connector 56, away from the first circuit board 50 are arranged the output terminal and the ground terminal of the video/audio output circuit 14.

The third connector 56 is arranged in a concentrated fashion along one edge of the second circuit board 60; specifically, the third connector 56 is arranged along the edge of the second circuit board 60 located in the direction forming the letter "L" with respect to the axis of the tuner input terminal 53.

The digital demodulating portion 12 and the digital circuit portion 13 are electromagnetically shielded from each other with a second shield plate 52. As the second circuit board 60, a multiple-layer circuit board is adopted so that the digital demodulating IC 21 provided in the digital demodulating portion 12 and the video/audio processing IC 24 provided in the digital circuit portion 13 are electrically connected together via an interlayer conductor pattern laid inside the second circuit board 60. These two ICs are mounted in positions apart from each other on the same face of the second circuit board 60. Moreover, the packages of the digital demodulating IC 21 and the video/audio processing IC 24 each make contact with the chassis 70 via a thermally conductive member laid in between.

The connection of the digital ground pattern of the second circuit board 60 to the chassis 70 and the connection of the analog ground pattern of the first circuit board 50 to the chassis 70 are both achieved with solder applied at several spots on the bottom faces of the circuit boards (see solder spots 81 to 88 shown in FIGS. 2A and 2B). Here, the bottom faces of the circuit boards denote the faces thereof at which the distance from them to the lids is smaller, in other words, the faces thereof at which the height of the side faces of the chassis is smaller. Performing soldering on the bottom faces of the circuit boards helps reduce the likeliness of the soldering machine or tool touching the side faces of the chassis during the manufacturing process of the receiver apparatus. This ensures highly efficient mounting.

Here, as shown in FIGS. 2A and 2B, the spots at which the ground patterns are connected to the chassis are located not only at one edge of the first and second circuit boards 50 and 60 but at two or more edges thereof. This increases the number of connection points between the chassis and the ground patterns, and thus helps reduce the connection impedance. In the example shown in FIGS. 2A and 2B, the soldering spots are located at all edges of the circuit boards. This permits an increased number of connection points to be efficiently distributed over a wide area, contributing to an accordingly low impedance.

Here, connecting the above-mentioned jumper wires 61 on the same face as the soldering spots, that is, on the bottom face, eliminates the need to turn the circuit boards over between when the jumper wires 61 are connected and when the ground patterns are connected to the chassis 70 with solder. This helps reduce the number of manufacturing steps.

The digital circuit portion 13 has the video/audio processing IC 24 mounted on one face (top face) of the second circuit board 60, and has the video/audio processing memory 22 and the program memory 23 mounted on the other face (bottom face) of the second circuit board 60. The video/audio processing IC 24, the video/audio processing memory 22, and the program memory 23 are electrically connected together via the interlayer conductor pattern.

The power supply terminals of the tuner circuit portion 11, the digital demodulating portion 12, the digital circuit portion 13, and the video/audio output circuit 14 are arranged, within the third connector 56, between the output terminal of the video/audio output circuit 14 and the IF output terminal of the tuner circuit portion 11.

With this configuration, as the result of the digital circuit portion 13 and the video/audio output circuit 14 being mounted on the circuit board of the receiver apparatus 3, the video display apparatus 4 now needs to incorporate only the display processing portion 31 for displaying as video the video signal fed from the receiver apparatus 3 and the audio processing portion 32 for outputting as audio the audio signal fed from the receiver apparatus 3. This eliminates the need to adopt a multiple-layer circuit board. In the conventional configuration, since the digital circuit portion is provided in the video display apparatus, measures against the unnecessary electromagnetic emission and noise generated by the video/audio processing IC, the video/audio processing memory, the program memory, and the like need to be taken in the video display apparatus. By contrast, with the configuration according to the present invention embodiment, the digital circuit portion is provided in the receiver apparatus, and thus the video display apparatus can be configured without a digital circuit portion. This eliminates the need to take measures against unnecessary electromagnetic emission and noise in the video display apparatus.

The first circuit board 50 now incorporates no IC having a large number, for example, several tens, of pins, and can thus adopt a circuit board having fewer layers than the second circuit board 60 provided with the video/audio processing IC and the digital demodulating IC. For example, the first circuit board 50 may adopt a two-layer circuit board and the second circuit board 60 a four-layer circuit board.

The digital demodulating IC 21 and the video/audio processing IC 24 mounted on the circuit board of the receiver apparatus 3 are each connected to the chassis 70 via a thermally conductive member laid in between. Thus, measures against the heat generated by the IC packages are taken. On the other hand, in the video display apparatus, which no longer needs to be provided with IC packages, no measures need to be taken against heat as by increasing the area of the circuit board or providing it with an additional heat-dissipating plate.

With the configuration according to the present invention embodiment, within the receiver apparatus, the first circuit board composed of analog circuits and the second circuit board composed of digital circuits are separated from each other. This prevents the digital noise generated by the digital demodulating portion and the digital circuit portion from entering the tuner circuit portion, and thus helps prevent degradation of the performance of the tuner circuit portion.

The analog ground pattern and the digital ground pattern are each electrically connected to the chassis 70. This eliminates the need to connect them, for ground connection, to the first connector provided on the first circuit board and the second connector provided on the second circuit board, and also helps reduce the impedance between the analog and digital grounds.

The third connector is provided along one edge of the second circuit board, and, via this connector, not only the input/output terminals of the tuner circuit portion 11, but also the input/output terminals related to the functional blocks mounted on the second circuit board, namely the digital demodulating portion 12, the digital circuit portion 13, the video/audio output circuit 14, and the power supply portion 15, are wired. This makes the design of the wiring in the video display apparatus easy.

Figure 3A:
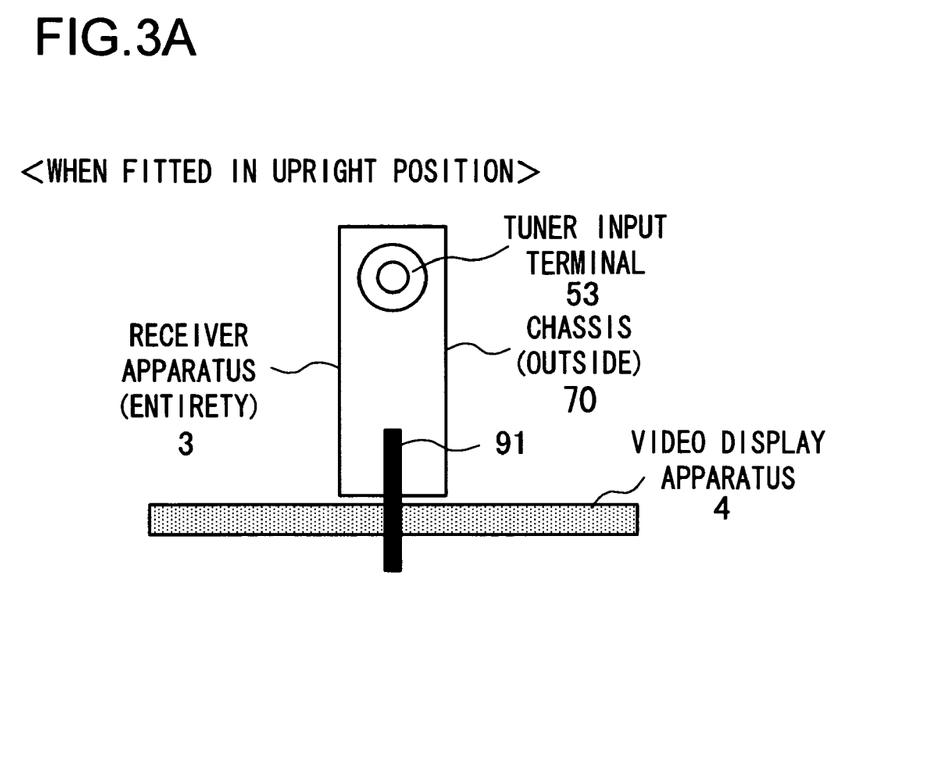
FIGS. 3A and 3B are diagrams conceptually showing how the receiver apparatus 3 and the video display apparatus 4 shown in FIG. 1 are fitted together.
Figure 3B:
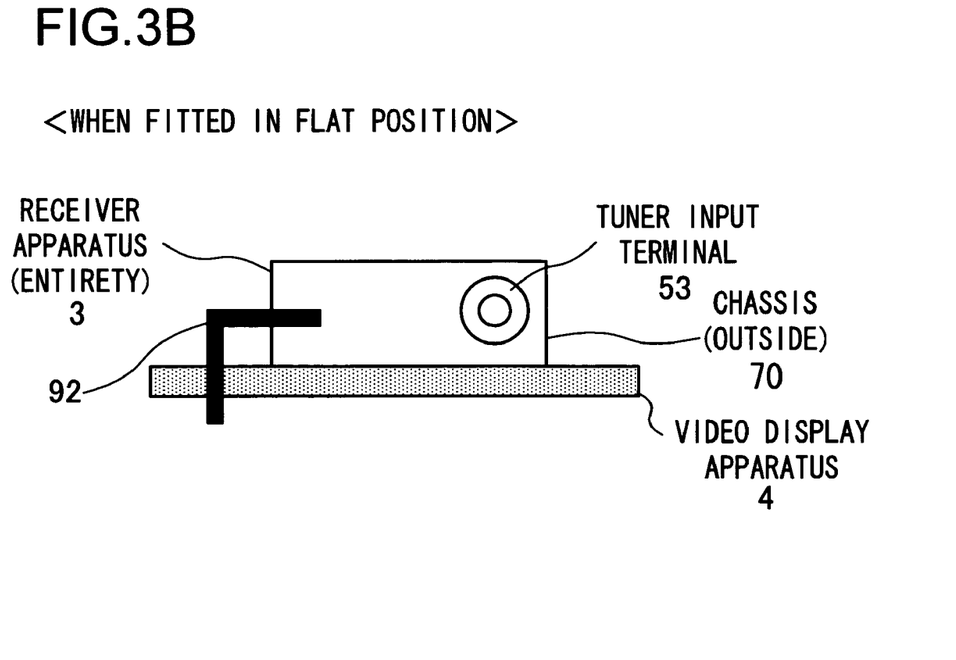

Now, how the receiver apparatus 3 and the video display apparatus 4 are connected together will be described with reference to drawings. FIGS. 3A and 3B are diagrams conceptually showing how the receiver apparatus 3 and the video display apparatus 4 shown in FIG. 1 are fitted together, with FIG. 3A showing the state where the receiver apparatus 3 is fitted in an upright position on the video display apparatus 4 and FIG. 3B showing the state where the receiver apparatus 3 is fitted in a flat position on the video display apparatus 4.

As shown in FIGS. 3A and 3B, when the receiver apparatus 3 is fitted in an upright position on the video display apparatus 4, the third connector 56 and the video display apparatus 4 are connected together with straight connector pins 91; on the other hand, when the receiver apparatus 3 is fitted in a flat position on the video display apparatus 4, the third connector 56 and the video display apparatus 4 are connected together with connector pins 92 bent in the "L" shape. That is, with this configuration, whether to mount the receiver apparatus in a flat position or in an upright position on the video display apparatus can be coped with simply by bending or leaving straight the pins of the input/output terminals. Thus, whichever of the two arrangements is desirable can be adopted with no design change as in component layout.

The soldering between the pins of the third connector 56 and the second circuit board 60 is performed only on one face (bottom face) thereof, and on the same face as the ground patterns of the circuit boards are soldered to the chassis 70 and as the jumper wires 61 for connecting together the first and second circuit boards 50 and 60 are soldered. This eliminates the need to turn the circuit boards over while, in the manufacturing process of the receiver apparatus, the input/output terminals are soldered to the second circuit board 60 and the ground patterns of the circuit boards are soldered to the chassis, and thus helps reduce the number of manufacturing steps.

Within the third connector 56, the IF output terminal of the tuner circuit portion 11 is arranged near the first circuit board, and, via this the IF output terminal, the IF signal is outputted. Within the third connector 56, the output terminal and the ground terminal of the video/audio output circuit 14 are arranged away from the first circuit board 50. Arranging the output terminal of the tuner circuit portion away from the output terminal of the video/audio output circuit in this way helps prevent the radio-frequency noise generated by the tuner circuit portion from entering the video/audio output circuit. Also, the digital noise generated by the digital demodulating portion and the digital circuit portion mounted on the second circuit board is prevented from mixing with the IF signal outputted from the tuner circuit portion.

The first and second circuit boards are separated from each other with a shield plate. This prevents the electromagnetic emission generated by the digital demodulating portion and the digital circuit portion mounted on the second circuit board from entering the tuner circuit portion on the first circuit board.

In addition, on the second circuit board, the digital demodulating portion and the digital circuit portion are separated from each other with a shield plate. This prevents the electromagnetic emission generated by the digital circuit portion from entering the digital demodulating portion.

On the second circuit board, the digital demodulating IC in the digital demodulating portion and the video/audio processing IC in the digital circuit portion are arranged in positions apart from each other on the same mount face. This permits the heat generated by the digital demodulating IC and the heat generated by the video/audio processing IC to spread out. In addition, the packages of these ICs each make contact with the chassis 70 via a thermally conductive member laid in between. This permits the heat to be dissipated to the chassis and the lids, and thus helps alleviate the accumulation of the heat.

A receiver system according to the present invention embodiment can be suitably used as a receiver system for receiving a digital television broadcast or the like to display received video.

What is claimed is:

1. A receiver apparatus comprising:
    a tuner circuit portion that converts a radio-frequency signal received by an antenna into an intermediate-frequency signal;
    a digital demodulating portion that converts the intermediate-frequency signal outputted from the tuner circuit portion into a compressed digital signal;
    a digital circuit portion that converts the compressed digital signal outputted from the digital demodulating portion into digital video and audio signals;
    a video/audio output circuit that converts the digital video and audio signals outputted from the digital circuit portion into analog video and audio signals, and
    a connecting portion that connects together conductor patterns between a first circuit board, on which the tuner circuit portion is arranged, and a second circuit board, on which the digital circuit portion, the digital demodulating portion, and the video/audio output circuit are arranged, wherein
    the receiver apparatus is covered with a chassis over all faces of the receiver apparatus facing outside the receiver apparatus,
    the first and second circuit boards are separated from each other with a first shield plate,
    an analog ground pattern of the first circuit board and a digital ground pattern of the second circuit board are electrically connected to the chassis, and
    the ground pattern of the circuit boards are connected to the chassis with solder applied only on one same face of the circuit boards.

2. The receiver apparatus of claim 1, wherein the connecting portion is composed of jumper wires.

3. The receiver apparatus of claim 1, wherein an IF output terminal for outputting the intermediate-frequency signal obtained through conversion by the tuner circuit portion is arranged at an edge of the first circuit board opposite to an edge thereof at which a tuner input terminal via which the radio-frequency signal received by the antenna is fed to the tuner circuit portion.

4. The receiver apparatus of claim 3, wherein
    the digital circuit portion includes:
        a video/audio processing IC that decodes compressed digital video and audio signals; and
        a video/audio processing memory that stores the compressed digital video and audio signals and decoded digital video and audio signals,
    the digital demodulating portion includes a digital demodulating IC, which is a processing IC for converting the intermediate-frequency signal into a digital signal, and
    the first circuit board adopts a circuit board having fewer layers than a circuit board adopted by the second circuit board.

5. The receiver apparatus of claim 4, wherein the first circuit board adopts a circuit board having two layers, and the second circuit board adopts a circuit board having four layers.

6. The receiver apparatus of claim 1, wherein
    the digital circuit portion includes:
        a video/audio processing IC that decodes compressed digital video and audio signals; and
        a video/audio processing memory that stores the compressed digital video and audio signals and decoded digital video and audio signals,
    the digital demodulating portion includes a digital demodulating IC, which is a processing IC for converting the intermediate-frequency signal into a digital signal, and
    the first circuit board adopts a circuit board having fewer layers than a circuit board adopted by the second circuit board.

7. The receiver apparatus of claim 6, wherein the first circuit board adopts a circuit board having two layers, and the second circuit board adopts a circuit board having four layers.

8. The receiver apparatus of claim 1, wherein the ground patterns of the circuit boards are connected to the chassis with solder applied on a bottom face of the circuit boards.

9. The receiver apparatus of claim 8, wherein the ground patterns of the circuit boards are connected to the chassis with solder applied at all edges of the circuit boards.

10. The receiver apparatus of claim 1, wherein the ground patterns of the circuit boards are connected to the chassis with solder applied at all edges of the circuit boards.

11. The receiver apparatus of claim 1, wherein the jumper wires that connect together the conductor patterns between the first and second circuit boards are connected only on one face of the circuit boards.

12. The receiver apparatus of claim 11, wherein the jumper wires that connect the conductor patterns between the first and second circuit boards are connected on a same face of the circuit boards as the ground patterns of the circuit boards are connected to the chassis.

13. A receiver apparatus comprising:
- a tuner circuit portion that converts a radio-frequency signal received by an antenna into an intermediate-frequency signal;
- a digital demodulating portion that converts the intermediate-frequency signal outputted from the tuner circuit portion into a compressed digital signal;
- a digital circuit portion that converts the compressed digital signal outputted from the digital demodulating portion into digital video and audio signals;
- a video/audio output circuit that converts the digital video and audio signals outputted from the digital circuit portion into analog video and audio signals, and
- a connecting portion that connects together conductor patterns between a first circuit board, on which the tuner circuit portion is arranged, and a second circuit board, on which the digital circuit portion, the digital demodulating portion, and the video/audio output circuit are arranged,
- wherein the receiver apparatus is covered with a chassis over all faces of the receiver apparatus facing outside the receiver apparatus, and
- on the second circuit board, input/output terminals of the tuner circuit portion, the digital demodulating portion, the digital circuit portion, and the video/audio output circuit are arranged in a concentrated fashion along one edge of the second circuit board, the one edge being located in a direction forming a letter "L" with respect to a tuner input terminal via which the radio-frequency signal received by the antenna is fed to the tuner circuit portion.

14. The receiver apparatus of claim 13, wherein on the second circuit board, the input/output terminals of the tuner circuit portion, the digital demodulating portion, the digital circuit portion, and the video/audio output circuit are connected to the second circuit board with solder applied on a same face thereof as the ground patterns of the circuit boards are connected to the chassis and as the jumper wires for connecting together the first and second circuit boards are soldered.

15. A receiver system comprising:
- the receiver apparatus of claim 1; and
- a video display apparatus that displays video based on a video signal outputted from the receiver apparatus and/or outputs audio based on an audio signal outputted from the receiver apparatus,
- wherein the receiver system receives digital and analog broadcast signals, extracts video and audio signals therefrom, and displays video and/or outputs audio according thereto.

16. A receiver system comprising:
- the receiver apparatus of claim 13; and
- a video display apparatus that displays video based on a video signal outputted from the receiver apparatus and/or outputs audio based on an audio signal outputted from the receiver apparatus,
- wherein the receiver system receives digital and analog broadcast signals, extracts video and audio signals therefrom, and displays video and/or outputs audio according thereto.

* * * * *